US007977903B2

(12) United States Patent
Kamiya

(10) Patent No.: US 7,977,903 B2

(45) Date of Patent: Jul. 12, 2011

(54) ELECTRICALLY POWERED DOOR ACTUATING SYSTEM OF MOTOR VEHICLE

(75) Inventor: Haruo Kamiya, Atsugi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 383 days.

(21) Appl. No.: 12/338,444

(22) Filed: Dec. 18, 2008

(65) Prior Publication Data

US 2009/0229183 A1 Sep. 17, 2009

(30) Foreign Application Priority Data

Mar. 13, 2008 (JP) ................................ 2008-063844

(51) Int. Cl.
*G05D 3/00* (2006.01)
*H02P 7/28* (2006.01)

(52) U.S. Cl. ........ 318/469; 318/266; 318/280; 318/466; 49/26; 49/27; 49/28; 324/661; 324/663; 250/221

(58) Field of Classification Search .................. 318/266, 318/280, 283, 466, 469; 49/26–28; 324/661, 324/663; 250/221
See application file for complete search history.

(56) References Cited

U.S. PATENT DOCUMENTS

2001/0042820 A1* 11/2001 Wilson .......................... 250/221
2005/0161973 A1* 7/2005 Yokomori ..................... 296/155
2007/0266635 A1 11/2007 Sugiura et al.

FOREIGN PATENT DOCUMENTS

JP 2007-138566 A 6/2007
JP 2007-308929 A 11/2007

* cited by examiner

*Primary Examiner* — Paul Ip
(74) *Attorney, Agent, or Firm* — Foley & Lardner LLP

(57) ABSTRACT

In an electrically powered door actuating system of a motor vehicle with a slide door, there is employed a control unit for controlling a door actuating device of the slide door. The control unit is configured to carry out, under a condition wherein the door actuating device is controlled to move the door in a closing or opening direction upon manipulation of a door control switch means, controlling the door actuating device to move the door in an opposite direction upon detecting an obstacle by a contact type obstacle sensor, and controlling the door actuating device to temporarily stop the movement of the door upon detecting an obstacle by a non-contact type obstacle sensor; and under a condition wherein the temporary stop of the door is kept, controlling the door actuating device to continue the temporary stop of the door upon detecting an obstacle by the contact and non-contact type obstacle sensors, and controlling the door actuating device to move the door in the same direction as that in which the door moved before the temporary stop of the door upon detecting no obstacle by the contact and non-contact type obstacle sensors.

20 Claims, 8 Drawing Sheets

ELECTRICALLY POWERED DOOR ACTUATING SYSTEM OF MOTOR VEHICLE

BACKGROUND OF THE INVENTION

1. Field of the Invention

The present invention relates in general to electrically powered door actuating systems, and more particularly to the systems of a type that employs an electric motor or the like for moving a vehicle door in opening/closing direction.

2. Description of the Related Art

Hitherto, various types of electrically powered door actuating systems have been proposed and put into practical use particularly in the field of motor vehicles. For protecting passengers from the moving door, almost all of the door actuating systems hitherto proposed employ a safety system that includes an obstacle sensor or sensors. That is, when, under opening/closing movement of the door, the sensor detects an obstacle ahead on a track of the door, the safety system stops the movement of the door or reverses the direction in which the door is moving. As the obstacle sensor, contact type and non-contact type have been used, which are shown in for example Japanese Laid-open Patent Application (tokkai) 2007-308929 and Japanese Laid-open Patent Application (tokkai) 2007-138566 respectively.

In the contact type, existence of an obstacle is detected by a direct contact of the sensor with the obstacle, while in the non-contact type, the existence of the obstacle is detected without contacting the obstacle.

SUMMARY OF THE INVENTION

Due to inherent constructions, the above-mentioned safety systems employed in the electrically powered door actuating system fail to provide the passengers with easy operation work for controlling the door actuating system. That is, once the door is stopped due to function of the safety system, restoring the door actuating system requires the passengers a troublesome and thus time-consumed restoring work.

Accordingly, it is an object of the present invention to provide an electrically powered door actuating system of a motor vehicle, which is free of the above-mentioned drawback.

More specifically, according to the present invention, there is provided an electrically powered door actuating system of a motor vehicle, which provides the passengers with easy operation work for restoring the door actuating system while assuring the safety operation of the door.

In accordance with a first aspect of the present invention, there is provided an electrically powered door actuating system of a motor vehicle, which comprises a door actuating device that, upon manipulation of a door control switch means, moves a slide door in closing or opening direction with power of an electric motor; a contact type obstacle sensor that detects an obstacle on a given track of the door by contacting the same; a non-contact type obstacle sensor that detects an obstacle on the given track of the door without contacting the same; and a control unit that controls the door actuating device by processing information signals issued from door control switch means and the contact and non-contact type obstacle sensors, wherein the control unit is configured to carry out, when the door actuating device is moving the door due to manipulation of the door control switch means, controlling the door actuating device to move the door in an opposite direction upon detecting an obstacle by the contact type obstacle sensor; when the door actuating device is moving the door due to manipulation of the door control switch means, controlling the door actuating device to temporarily stop the movement of the door upon detecting an obstacle by the non-contact type obstacle sensor; and when the temporary stop of the door is being kept by the door actuating device, controlling the door actuating device to keep the temporary stop of the door upon detecting an obstacle by the contact and non-contact type obstacle sensors, and controlling the door actuating device to move the door in the same direction as that in which the door moved before the temporary stop of the door upon detecting no obstacle by the contact and non-contact obstacle sensors.

In accordance with a second embodiment of the present invention, there is provided an electrically powered door actuating system of a motor vehicle with a slide door, which comprises a door actuating device that, upon manipulation of a door control switch means, moves the slide door in a closing direction with power of an electric motor; an electromagnetic clutch that is operatively disposed between the door actuating device and the electric motor; a contact type obstacle sensor that detects an obstacle on a given track of the door by contacting the same; a non-contact type obstacle sensor that detects an obstacle on the given track of the door without contacting the same; and a control unit that controls the door actuating device and the electromagnetic clutch by processing information signals issued from the door control switch means and the contact and non-contact type obstacle sensors, wherein the control unit is configured to carry out, under a condition wherein the door actuating device is controlled to move the door in a closing or opening direction upon manipulation of the door control switch means, controlling the door actuating device to move the door in an opposite direction upon detecting an obstacle by the contact type obstacle sensor, and controlling the door actuating device to temporarily stop the movement of the door upon detecting an obstacle by the non-contact type obstacle sensor; and under a condition wherein the temporary stop of the door is kept, controlling the door actuating device to continue the temporary stop of the door upon detecting an obstacle by the contact and non-contact type obstacle sensors, and controlling the door actuating device to move the door in the same direction as that in which the door moved before the temporary stop of the door upon detecting no obstacle by the contact and non-contact type obstacle sensors.

BRIEF DESCRIPTION OF THE DRAWING

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

Figure 1:
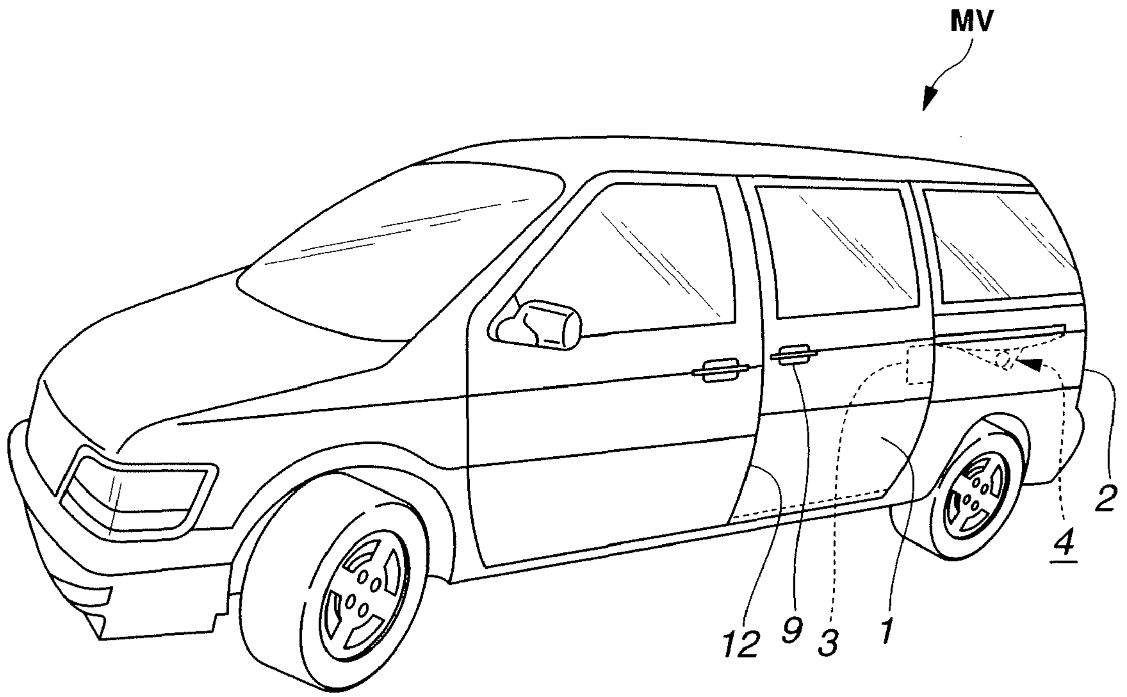
FIG. 1 is a perspective view of a motor vehicle to which the to present invention is practically applied.

In FIG. 1, there is shown a motor vehicle "MV" to which an electrically powered door actuating system of the present invention is practically applied.

In the drawing, denoted by numeral 1 is a slide door that is movable forward and rearward along a door track to close and open a door opening 12 formed in a vehicle body 2. Denoted by numeral 3 is a door latch that is mounted to an inner rear end of the slide door 1 for latching the slide door 1 when the door 1 is brought to the full-close position as shown in FIG. 1. Although not shown in the drawing, a striker is mounted to the vehicle body 2, which is caught by the door latch 3 for achieving the latching of the slide door 1.

For moving the slide door 1 with electric power, there is mounted, at a rear side portion of the vehicle body 2, an electrically powered door actuating device 4.

Figure 3:
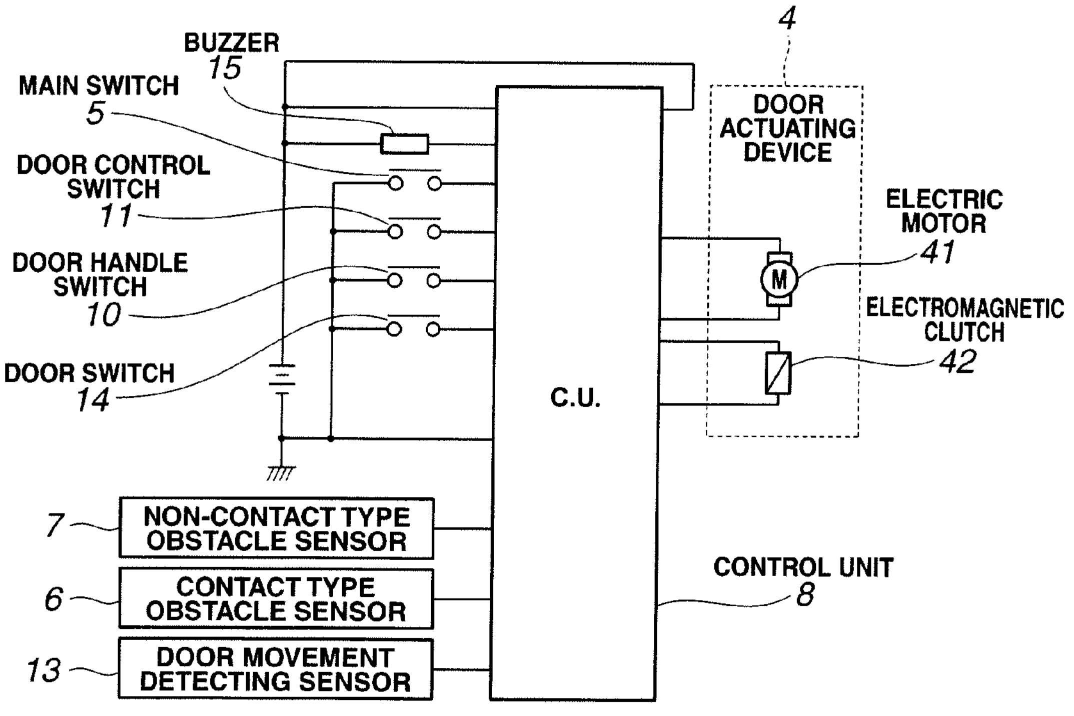
FIG. 3 is a block diagram of a control unit employed in the present invention for controlling operation of the slide door.

As is shown in FIG. 3, the door actuating device 4 generally comprises an electric motor 41 that is mounted to the vehicle body 2, a power transmission mechanism (not shown) that moves the slide door 1 along a given track with driving power produced by the electric motor 41, and an electromagnetic clutch 42 that selectively closes and opens a power transmission connection between the electric motor 41 and the power transmission mechanism.

Thus, when, with the clutch 42 kept engaged, the electric motor 41 is energized, the driving power of the electric motor 41 is transmitted to the power transmission mechanism to move the slide door 1 forward or rearward along the door track. The traveling direction of the slide door 1 is controlled by the rotation direction of the electric motor 41.

When the clutch 42 is kept disengaged, the slide door 1 can be moved manually in a forward or rearward direction. That is, under such condition, the manual movement of the slide door 1 has no effect on rotation of a rotor of the motor 41 because of the open or disengaged condition between the motor 41 and the power transmission mechanism.

When the slide door 1 is in a position (or half-position) between full-closed and full-open positions, having the clutch 42 engaged induces generation of a braking force with which the slide door 1 is kept retained at the half-position. Of course, in this case, the electric motor 41 is not energized.

Figure 2:
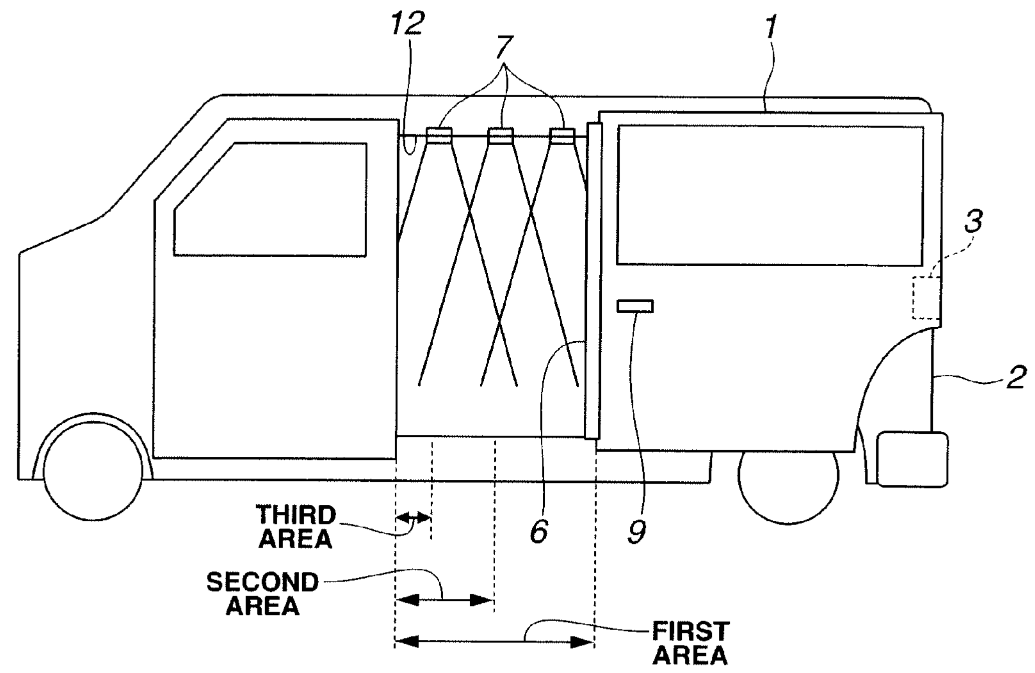
FIG. 2 is a side view of the motor vehicle in a condition wherein a slide door is opened.

As is seen from FIG. 2, on a front edge of the slide door 1, there is mounted a contact type obstacle sensor 6 that is able to detect an obstacle by contacting the same. The sensor 6 is like an elongate tape and bonded to the front edge of the slide door 1 in a manner to extend along the same. Actually, the sensor 6 is of a pressure sensitive type that detects existence of an obstacle by sensing a certain pressure produced in the sensor 6 when the obstacle contacts the sensor 6. If desired, the obstacle sensor 6 may be mounted on a front edge of the door opening 12 or a rear edge of the slide door 1.

As is seen from FIG. 2, beneath an upper edge of the door opening 12, there is mounted a non-contact type obstacle sensor 7 that is able to detect an obstacle in the door opening 12 without contacting the same. This sensor 7 may be of a laser type, an ultrasonic type, an electrostatic capacitance type or an image pick-up type (camera). The sensor 7 may be mounted to other positions so long as it can detect an obstacle in the door opening 12.

As is seen from FIG. 3, the electric motor 41 and the electromagnetic clutch 42 of the electrically powered door actuating device 4 are controlled by a control unit 8 mounted on the vehicle body 2. The control unit 8 is a microcomputer that generally comprises CPU (central processing unit), RAM (random access memory), ROM (read only memory), and Input and Output interfaces.

As shown, to the Input interface, there are connected a door handle switch 10 that detects operation of a door handle 9 mounted on the slide door 1, a door control switch 11 that is mounted in a driver's cabin to be manipulated by a driver, a main switch 5 that is also mounted in the driver's cabin, the above-mentioned contact type obstacle sensor 6, the above-mentioned non-contact type obstacle sensor 7, a door movement detecting sensor 13 that includes a rotary encoder to detect movement of the slide door 1, and a door full-closed condition detecting switch 14 that detects the full-closed condition of the slide door 1. Although not shown in the drawing, a remote control switch may be connected to the Input interface.

To the Output interface, there are connected an alarm buzzer 15 that issues alarm sounds when energized, the above-mentioned electric motor 41, the above-mentioned electromagnetic clutch 42 and other actuators (not shown).

The control unit 8 comprises a door movement detecting section that, based on an information signal issued from the door movement detecting sensor 13, detects a movement of the slide door 1 and a traveling direction of the slide door 1, a door position detecting section that, based on the information signal from the sensor 13, detects a current position of the slide door 1, and a first timer section that counts a first predetermined time from a time on which an after-mentioned temporary halt control of the door actuating device 4 starts.

As is seen from FIG. 2, by the work of the non-contact type obstacle sensor 7, predetermined three areas are previously provided for the slide door 1, which are a first area that provides the door opening 12 with a large open space sufficient for ingress/egress of an adult passenger, a second area that provides the door opening 12 with a medium open space sufficient for ingress/egress of a child passenger, and a third area that provides the door opening 12 with only a small open space insufficient for ingress/egress of the child passenger.

By processing various information signals issued from the sensors 6, 7 and 13 and switches 5, 11 (door control switch), 10 (door handle switch) and 14 (door switch), the control unit 8 issues instruction signals to the electric motor 41 and electromagnetic clutch 42 to control the same. It is be noted that the control of the motor 41 and clutch 42 is possible only when the main switch 5 is kept ON. In other words, such control is not possible when the main switch 5 is kept OFF.

In the following, six embodiments 100, 200, 300, 400, 500 and 600 of the present invention will be described in detail with reference to respective flow charts shown in FIGS. 4 to 9.

The following description is directed to only a control for the slide door 1 under closing movement. It is to be noted that a control for the slide door 1 under opening movement is substantially the same as the control for the slide door 1 under closing movement except for the traveling direction of the door 1.

Figure 4:
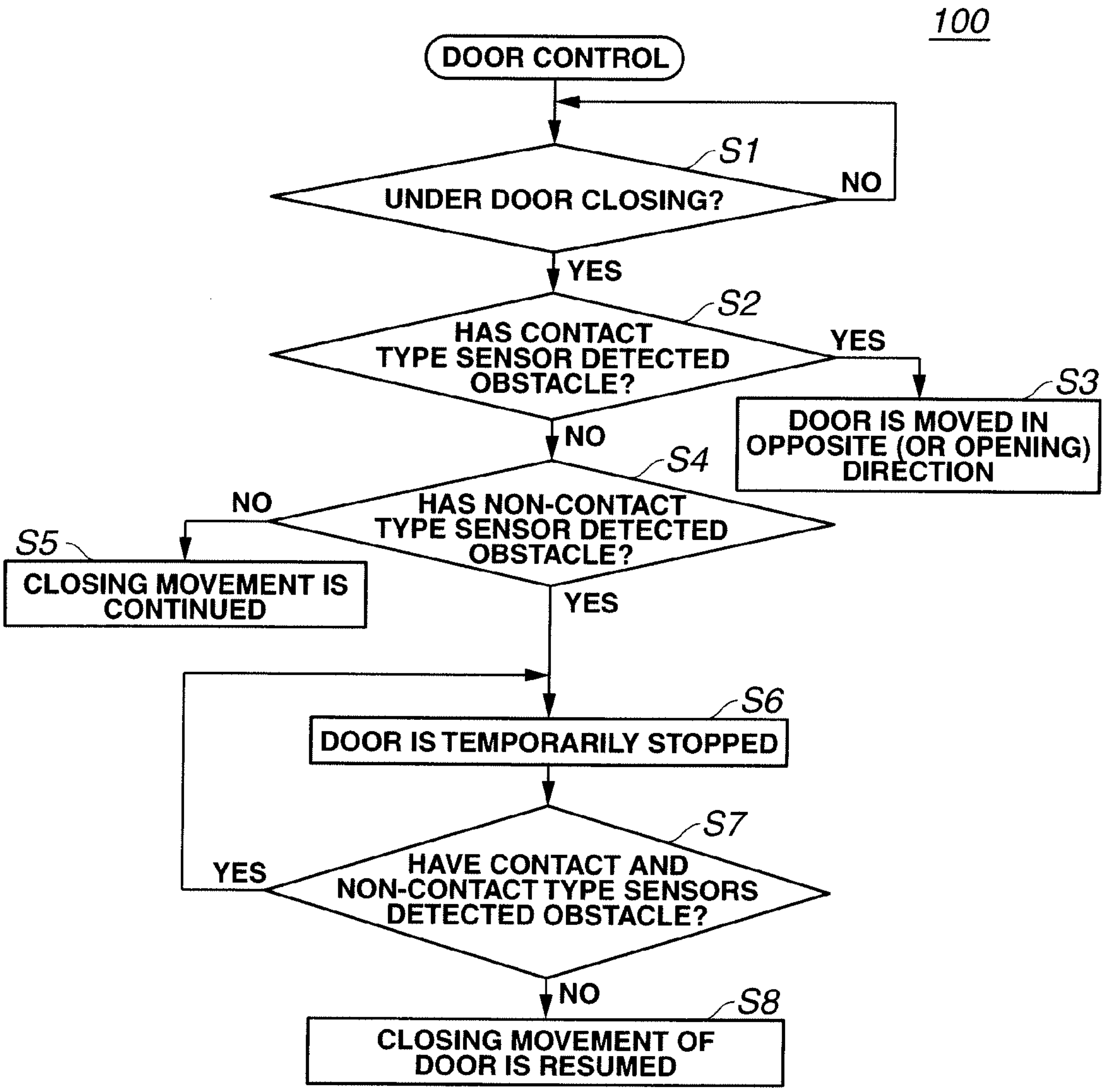
FIG. 4 is a flowchart of programmed operation steps executed by the control unit for carrying out a door control of a first embodiment of the invention.

First, a first embodiment 100 of the invention will be described with reference to the flowchart of FIG. 4.

In the first embodiment 100, the following major controls (a), (b) and (c) are carried out in the control unit 8 for controlling the slide door 1 under movement.

(a) When it is judged that the slide door 1 is under closing movement and the contact type obstacle sensor 6 has detected an obstacle (or passenger) in the door opening 12, the door actuating device 4 is controlled to move the slide door 1 in an opposite (or opening) direction.

(b) When it is judged that the slide door 1 is under closing movement and the contact and non-contact type obstacle sensors 6 and 7 have detected no obstacle (or passenger) in the door opening 12, the door actuating device 4 is controlled to continue the closing movement of the slide door 1.

(c) When it is judged that the slide door 1 is under closing movement, the contact type obstacle sensor 6 has detected no obstacle (or passenger) and the non-contact type obstacle sensor 7 has detected an obstacle (or passenger), the door actuating device 4 is controlled to temporarily stop the closing movement of the slide door 1. When, during the temporary halt of the slide door 1, the contact and non-contact type obstacle sensors 6 and 7 detect no obstacle (or passenger) in the door opening 12, the closing movement of the slide door 1 is resumed.

That is, in the first embodiment 100, the following programmed operation steps are carried out in the control unit 8 for controlling the slide door 1 that is under movement.

At step S1, judgment is carried out as to whether the slide door 1 is under closing movement or not. If NO, that is, when it is judged that the slide door 1 is not under closing movement, the same judgment operation is repeated. While, if YES, that is, when it is judged that the slide door 1 is under closing movement, the operation flow goes to step S2.

At step S2, judgment is carried out as to whether the contact type obstacle sensor 6 has detected an obstacle or not. If YES, that is, when the sensor 6 has detected the obstacle, the operation flow goes to step S3 to cause the door actuating device 4 to move the slide door 1 in an opposite or opening direction. While, if NO at step S2, that is, when the sensor 6 has detected no obstacle, the operation flow goes to step S4.

At step S4, judgment is carried out as to whether the non-contact type obstacle sensor 7 has detected an obstacle or not. If NO, that is, when the non-contact type obstacle sensor 7 has detected no obstacle, the operation flow goes to step S5 to cause the door actuating device 4 to continue the closing movement of the slide door 1. While, if YES, that is, when the non-contact type obstacle sensor 7 has detected the obstacle, the operation flow goes to step S6 to cause the door actuating device 4 to temporarily stop the closing movement of the slide door 1 by de-energizing the motor 41.

After step S6 wherein the slide door 1 has made a temporary stop, the operation flow goes to step S7.

At this step S7, judgment is carried out as to whether the contact and non-contact type obstacle sensors 6 and 7 have detected an obstacle or not. If YES, that is, when the contact and non-contact type obstacle sensors 6 and 7 have detected an obstacle, the operation flow goes back to step S6 to continue the temporary halt control for the slide door 1. If NO at step S7, that is, when neither of the contact and non-contact type obstacle sensors 6 and 7 has detected an obstacle, the operation flow goes to step S8 to cause the door actuating device 4 to resume the closing movement of the slide door 1.

The above-mentioned programmed operation steps of the first embodiment 100 will be more clearly understood from the following description.

That is, when the slide door 1 is in the full-open position, the control unit 8 carries out information signal processing work for judging whether the slide door 1 should be moved in the closing direction or not. If information signals from the switches 5, 11, 10, 14 and sensors 6, 7 and 13 make the control unit 8 judge permission of movement of the slide door 1 in the closing direction, the control unit 8 issues an instruction signal to the clutch 42 to be engaged and an instruction signal to the electric motor 41 to rotate in a direction to induce the closing movement of the slide door 1. Such judgment takes place when the main switch 5 is kept ON, neither of the contact and non-contact type obstacle sensors 6 and 7 detects an obstacle and one of the door handle switch 10, the door control switch 11 and the remote control switch (not shown) is turned ON for the purpose of closing the slide door 1. The closing movement of the slide door 1 is checked by step S1.

If, under the closing movement of the slide door 1, the contact type obstacle sensor 6 detects a passenger in the door opening 12 by contacting the passenger, step S2 issues YES answer for rotating the electric motor 41 in an opposite direction to move the slide door 1 in the opening direction at step S3. With this, the passenger is prevented from being caught in the slide door 1.

When, under closing movement of the slide door 1, the contact type obstacle sensor 6 detects no passenger in the door opening 12, step S4 is carried out in the following manner.

At step S4, if, under the closing movement of the slide door 1, the non-contact type obstacle sensor 7 detects no passenger in the door opening 12, the control unit 8 controls the door actuating device 4 to continue the closing movement of the slide door 1. That is, when no passenger is detected by either of the contact and non-contact obstacle sensors 6 and 7, that is, when it is judged that the closing movement of the slide door 1 induces no danger, the closing movement of the slide door 1 is continued until the door 1 reaches the full-closed position.

While, at step S4, if, under the closing movement of the slide door 1, the non-contact type obstacle sensor 7 detects a passenger in the door opening 12, the control unit 8 controls the door actuating device 4 to temporarily stop the closing movement of the slide door 1 (step S6). For this temporary stop of the slide door 1, the electric motor 41 is temporarily de-energized keeping the engaged condition of the electromagnetic clutch 42. Thus, in this case, the slide door 1 stops at a half-position. Due to the engaged condition of the clutch 42, movement of the slide door 1 may induce rotation of a rotor of the electric motor 41. However, rotation of the motor rotor under such condition is almost impossible due to a marked braking force produced by a speed reduction gear arranged between the motor 41 and the clutch 42. Accordingly, the slide door 1 is kept stopped at the half-position.

When, at step S7, with the slide door 1 kept in the half-position, the contact and non-contact type obstacle sensors 6 and 7 detect a passenger in the door opening 12, the temporary halt condition of the slide door 1 is continued (viz., step S6) until the passenger steps aside from the door opening 12. In other words, as long as the passenger stays in the door opening 12, the half-opened slide door 1 makes no movement.

When the passenger steps aside from the door opening 12, that is, when neither of the contact and non-contact type obstacle sensors 6 and 7 detects a passenger in the door opening 12, the closing movement of the slide door 1 is resumed.

As is described hereinabove, in the first embodiment 100, in case wherein during closing movement of the slide door 1, the door 1 makes a temporary halt at a half position upon finding an obstacle (or passenger) in the door opening 12 by the non-contact type obstacle sensor 7, and the temporary halt of the slide door 1 is continued until the obstacle (or passenger) is removed from the door opening 12. When the obstacle (or passenger) is removed from the door opening 12, the closing movement of the slide door 1 is resumed. Thus, the passenger can enjoy a safety movement of the slide door 1 without need of doing troublesome operation work to the door actuating device 4.

In the following, a second embodiment 200 of the present invention will be described with reference to the flowchart of FIG. 5.

In the second embodiment 200, the following major controls (a), (b), (c2) and (d) are carried out in the control unit 8 for controlling the slide door 1 under movement.

(a) When it is judged that the slide door 1 is under closing movement and the contact type obstacle sensor 6 has detected an obstacle (or passenger) in the door opening 12, the door actuating device 4 is controlled to move the slide door 1 in an opposite (or opening) direction.

(b) When it is judged that the slide door 1 is under closing movement and the contact and non-contact type obstacle sensors 6 and 7 have detected no obstacle (or passenger) in the door opening 12, the door actuating device 4 is controlled to continue the closing movement of the slide door 1.

(c1) When it is judged that the slide door 1 is under closing movement, the contact type obstacle sensor 6 has detected no obstacle and the non-contact type obstacle sensor 7 has detected an obstacle (or passenger), the door actuating device 4 is controlled to temporarily stop the closing movement of the slide door 1. Upon this, a first timer means starts to count a time. When, during the temporary halt of the slide door 1, the contact and non-contact type obstacle sensors 6 and 7 detect no obstacle (or passenger) in the door opening 12, the closing movement of the slide door 1 is resumed.

(d) If, at a time when the time counted by the first timer means shows a predetermined time (for example, 10 minutes), the contact and non-contact type obstacle sensors 6 and 7 detect any obstacle (or passenger), the door actuating device 4 is controlled to move the slide door 1 in an opposite (or opening) direction.

That is, in the second embodiment 200, the following programmed operation steps are carried out in the control unit 8 for controlling the slide door 1 that is under movement.

At step S1, judgment is carried out as to whether the slide door 1 is under closing movement or not. If NO, the same judging operation is repeated. While, if YES, that is, when it is judged that the slide door 1 is under closing movement, the operation flow goes to step S2.

At step S2, judgment is carried out as to whether the contact type obstacle sensor 6 has detected an obstacle (or passenger) or not. If YES, that is, when the sensor 6 has detected the obstacle in the door opening 12, the operation flow goes to step 53 to cause the door actuating device 4 to move the slide door 1 in an opposite or opening direction. While, if NO, that is, when the sensor 6 has detected no obstacle, the operation flow goes to step S4.

At step S4, judgment is carried out as to whether the non-contact type obstacle sensor 7 has detected an obstacle or not. If NO, that is, when the sensor 7 has detected no obstacle, the operation flow goes to step S5 to cause the door actuating device 4 to continue the closing movement of the slide door 1. While, if YES, that is, when the sensor 7 has detected an obstacle, the operation flow goes to step S6 to cause the door actuating device 4 to temporarily stop the closing movement of the slide door 1 by de-energizing the electric motor 41. Then, the operation flow goes to step S10.

At step S10, time starts to be counted by a first timer means and the operation flow goes to step S11.

At step S11, judgment is carried out as to whether the contact and non-contact type obstacle sensors 6 and 7 have detected any obstacle or not. If NO, that is, when the sensors 6 and 7 have detected no obstacle, the operation flow goes to step S12 to cause the door actuating device 4 to resume the closing movement of the slide door 1. While, if YES at step S11, that is, when the sensors 6 and 7 have detected any obstacle, the operation flow goes to step S13.

At step S13, judgment is carried out as to whether the time being counted by the first timer means shows a predetermined time (for example, ten minutes) or not. If NO, that is, when the counted time does not show the predetermined time, the operation flow goes back to step S11 to repeat the operation of step S11. While, if YES, that is, when the counted time shows the predetermined time, the operation flow goes to step S3 to cause the door actuating device 4 to move the slide door 1 in an opposite or opening direction.

The above-mentioned programmed operation steps of the second embodiment 200 will be more clearly understood from the following description.

Figure 5:
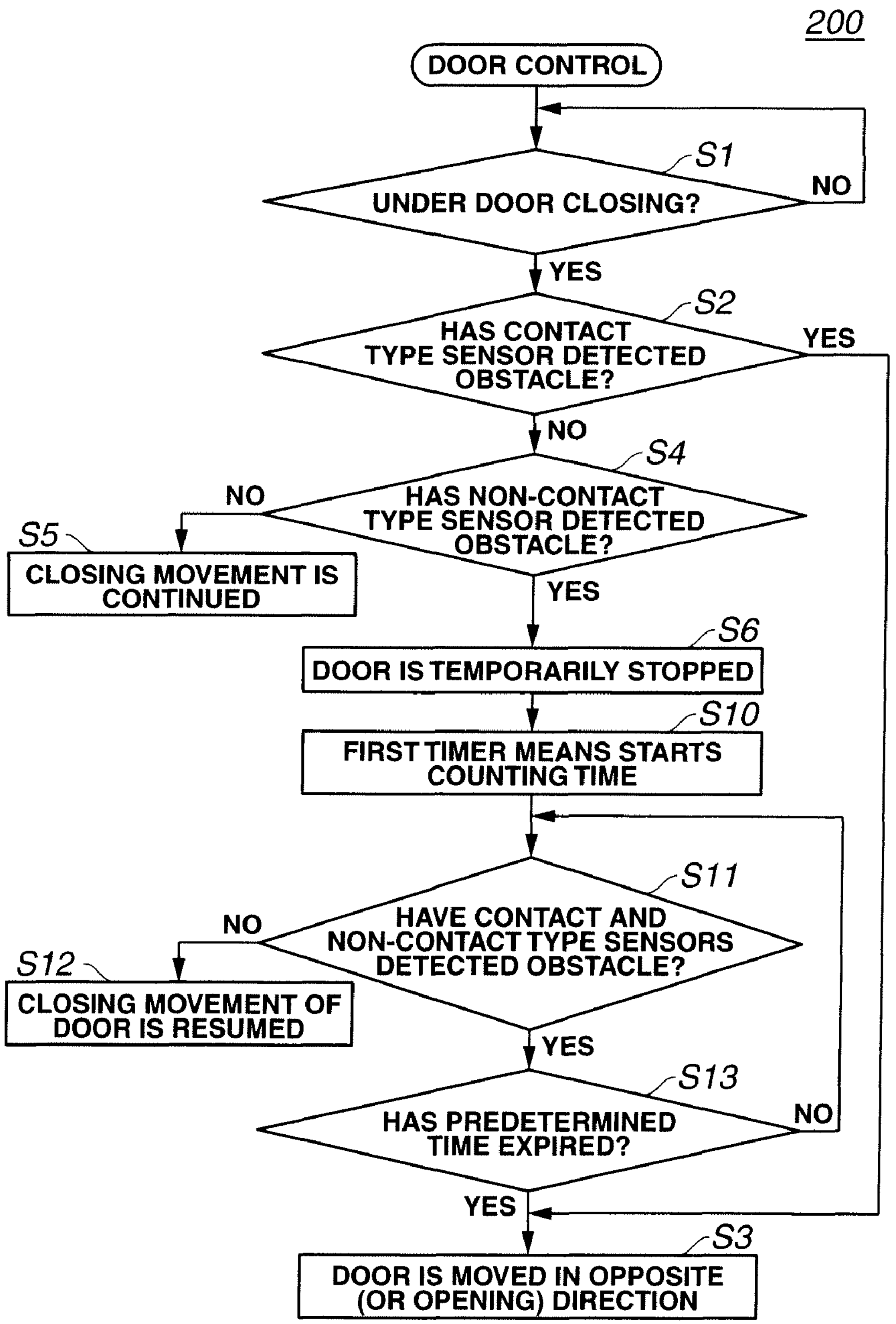
FIG. 5 is a flowchart of programmed operation steps executed by the control unit for carrying out a door control of a second embodiment of the invention.

As is seen from the flowchart of FIG. 5, the respective operations of steps S1, S2, S3, S4, S5 and S6 are the same as those of the above-mentioned first embodiment 100. Thus, explanation of such steps will be substantially omitted from the following description.

When the temporary halt control starts (S6) after receiving YES answer at step S4, the operation flow goes to step S10 to cause the first timer means to start time counting. Then, the operation flow goes to step S11. If, in this step S11, neither of the contact and non-contact type obstacle sensors 6 and 7 have detected an obstacle or passenger in the door opening 12, the closing movement of the slide door 1 is resumed and the door 1 is thus moved to the full-closed position (S12). If the contact and non-contact type obstacle sensors 6 and 7 have detected an obstacle or passenger at a time when a predetermined time (ten minutes) has passed from the time when the temporary halt control started, the door actuating device 4 is controlled to move the slide door 1 in an opposite or opening direction (S3). However, when the contact and non-contact type obstacle sensors 6 and 7 have detected an obstacle or passenger in the predetermined time (for example, ten minutes), the operation of step S11 is repeated.

As is understood from the above, in the second embodiment 200, when, at the time when a predetermined time (ten minutes) has passed from the time when the temporary halt control started, the obstacle or passenger is still placed in the door opening 12, the slide door 1 is moved in an opposite or opening direction. This is quite convenient motion to the passenger. Of course, the passenger can enjoy the safety movement of the slide door 1 without need of doing troublesome operation work to the door actuating device 4 like in the above-mentioned first embodiment 100.

In the following, a third embodiment 300 of the present invention will be described with reference to the flowchart of FIG. 6.

In the third embodiment 300, the following major controls (a), (b), (c1) and (d1) are carried out in the control unit 8 for controlling movement of the slide door 1.

(a) When it is judged that the slide door 1 is under closing movement and the contact type obstacle sensor 6 has detected an obstacle (or passenger) in the door opening 12, the door actuating device 4 is controlled to move the slide door 1 in an opposite (or opening) direction.

(b) When it is judged that the slide door 1 is under closing movement and the contact and non-contact type obstacle sensors 6 and 7 have detected an obstacle (or passenger) in the door opening 12, the door actuating device 4 is controlled to continue the closing movement of the slide door 1.

(c1) When it is judged that the slide door 1 is under closing movement, the contact type obstacle sensor 6 has detected no obstacle and the non-contact type obstacle sensor 7 has detected an obstacle (or passenger), the door actuating device 4 is controlled to temporarily stop the closing movement of the slide door 1. Upon this, a first timer means starts to count a time. When, during the temporary halt of the slide door 1, the contact and non-contact type obstacle sensors 6 and 7 detect no obstacle (or passenger) in the door opening 12, the closing movement of the slide door 1 is resumed.

(d1) If, at a time when the time counted by the first timer means shows a predetermined time (for example, ten minutes), the contact and non-contact type obstacle sensors 6 and 7 detect any obstacle (or passenger), the control of the door actuating device 4 is suspended.

That is, in the third embodiment 300, the following programmed operation steps are carried out in the control unit 8 for controlling the slide door 1 that is under movement.

At step S1, judgment is carried out as to whether the slide door 1 is under closing movement or not. If NO, the same judging operation is repeated. While, if YES, the operation flow goes to step S2.

At step S2, judgment is carried out as to whether the contact type obstacle sensor 6 has detected an obstacle (or passenger) or not. If YES, the operation flow goes to step S3 to cause the door actuating device 4 to move the slide door 1 in an opposite or opening direction. While, if NO at step S2, the operation flow goes to step S4.

At step S4, judgment is carried out as to whether the non-contact type obstacle sensor 7 has detected an obstacle or not. If NO, the operation flow goes to step S5 to cause the door actuating device 4 to continue the closing movement of the slide door 1. While, if YES at step S4, that is, when the sensor 7 has detected an obstacle, the operation flow goes to step S6 to cause the door actuating device 4 to temporarily stop the closing movement of the slide door 1 by de-energizing the electric motor 41. Then, the operation flow goes to step S10.

At step S10, time starts to be counted by a first timer means and the operation flow goes to step S11.

At step S11, judgment is carried out as to whether the contact and non-contact type obstacle sensors 6 and 7 have detected any obstacle or not. If NO, the operation flow goes to step S12 to cause the door actuating device 4 to resume the closing movement of the slide door 1. While, if YES at step S11, that is, when the sensors 6 and 7 have detected any obstacle, the operation flow goes to step S13.

At step S13, judgment is carried out as to whether the time being counted by the first timer means shows a predetermined time (for example, ten minutes) or not. If NO, the operation flow goes back to step S11 to repeat the above-mentioned operation of step S11. While, if YES, that is, when the counted time shows the predetermined time, the operation flow goes to step S14 to discontinue the temporary halt control for the door actuating device 4.

The above-mentioned programmed operation steps of the to third embodiment 300 will be more clearly understood from the following description.

Figure 6:
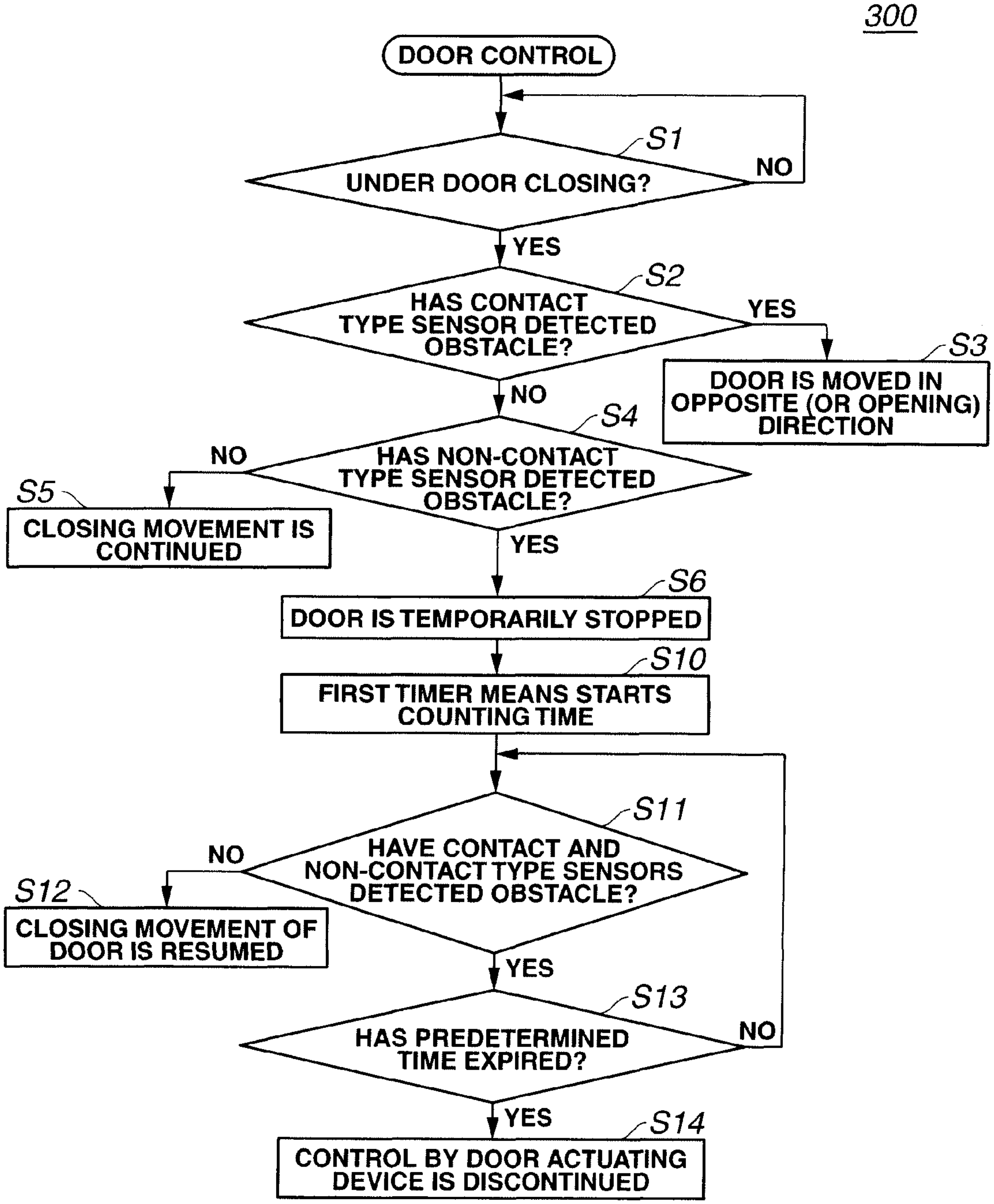
FIG. 6 is a flowchart of programmed operation steps executed by the control unit for carrying out a door control of a third embodiment of the invention.

As is seen from the flowchart of FIG. 6, the respective operations of steps S1 to S13 are the same as those of the above-mentioned second embodiment 200 of FIG. 5. Thus, explanation of such steps will be almost omitted from the following description.

When YES answer is issued from step S11 at a time when a predetermined time (for example, ten minutes) has passed from the time when the temporary halt control started, the temporary halt control for the door actuating device 4 is discontinued. Accordingly, the temporary halt control is not uselessly continued for a long time, which saves electric energy consumed by the door actuating device 4.

In the following, a fourth embodiment 400 of the present invention will be described with reference to the flowchart of FIG. 7.

In the fourth embodiment 400, the following major controls (a), (b1), (c2) and (d) are carried out in the control unit 8 for controlling movement of the slide door 1.

(a) When it is judged that the slide door 1 is under closing movement and the contact type obstacle sensor 6 has detected an obstacle (or passenger) in the door opening 12, the door actuating device 4 is controlled to move the slide door 1 in an opposite (or opening) direction.

(b) When it is judged that the slide door 1 is under closing movement and the contact and non-contact type obstacle sensors 6 and 7 have detected no obstacle (or passenger) in the door opening 12, the door actuating device 4 is controlled to continue the closing movement of the slide door 1.

(c2) When it is judged that the slide door 1 is under closing movement, the contact type obstacle sensor 6 has detected no obstacle and the non-contact type obstacle sensor 7 has detected an obstacle (or passenger), the door actuating device 4 is controlled to temporarily stop the closing movement of the slide door 1. Upon this, a first timer means starts to count a time, and at the same time, the engaged condition of the clutch 42 is released. If, during the temporary halt of the slide door 1, the slide door 1 is subjected to a movement, the clutch 42 becomes engaged again.

(d) When, during the temporary halt of the slide door 1, the slide door 1 is not subjected to a movement and the contact and non-contact type obstacle sensors 6 and 7 detect no obstacle or passenger in the door opening 12, the closing movement of the slide door 1 is resumed. While, when, during the temporary halt of the slide door 1, the slide door 1 is not subjected to a movement and the contact and non-contact type obstacle sensors 6 and 7 detect any obstacle in the door opening 12 at a time when the time counted by the first timer means shows a predetermined time (for example 10 minutes), the slide door 1 is moved in an opposite (or opening) direction.

That is, in the fourth embodiment 400, the following programmed operation steps are carried out in the control unit 8 for controlling the slide door 1 that is under movement.

At step S1, judgment is carried out as to whether the slide door 1 is under closing movement or not. If NO, the same judging operation is repeated. While, if YES, that is, when the slide door 1 is under closing movement, the operation flow goes to step S2.

At step S2, judgment is carried out as to whether the contact type obstacle sensor 6 has detected an obstacle (or passenger) or not. If YES, the operation flow goes to step S3 to cause the door actuating device 4 to move the slide door 1 in an opposite or opening direction. While, if NO, the operation flow goes to step S4.

At step S4, judgment is carried out as to whether the non-contact type obstacle sensor 7 has detected an obstacle or not. If NO, the operation flow goes to step S5 to cause the door actuating device 4 to continue the closing movement of the slide door 1. While, if YES, the operation flow goes to step S6 to cause the door actuating device 4 to temporarily stop the closing movement of the slide door 1 by de-energizing the electric motor 41. Then, the operation flow goes to step S10.

At step S10, time starts to be counted by a first timer means and the operation flow goes to step S20.

At step S20, the clutch 42 is disengaged, and the operation flow goes to step S21.

At step S21, judgment is carried out as to whether the slide door 1 has moved or not. If YES, that is, when it is judged that movement of the slide door 1 has occurred, the operation flow goes to step S22 to cause the clutch 42 to be engaged. If NO, that is, when it is judged that movement of the slide door 1 has not occurred, the operation flow goes to step S11.

At step S11, judgment is carried out as to whether the contact and non-contact type obstacle sensors 6 and 7 have detected any obstacle or not. If NO, the operation flow goes to step S12 to cause the door actuating device 4 to resume the closing movement of the slide door 1. While, if YES, that is, when the sensors 6 and 7 have detected any obstacle, the operation flow goes to step S13.

At step S13, judgment is carried out as to whether the time being counted by the first timer means shows a predetermined time (for example, ten minutes) or not. If NO, the operation flow goes back to step S11 to repeat the operation of step S11. While, if YES, that is, when the counted time shows the predetermined time, the operation flow goes to step S3 to cause the door actuating device 4 to move in an opposite or opening direction.

The above-mentioned programmed operation steps of the fourth embodiment 400 will be more clearly understood from the following description.

Figure 7:
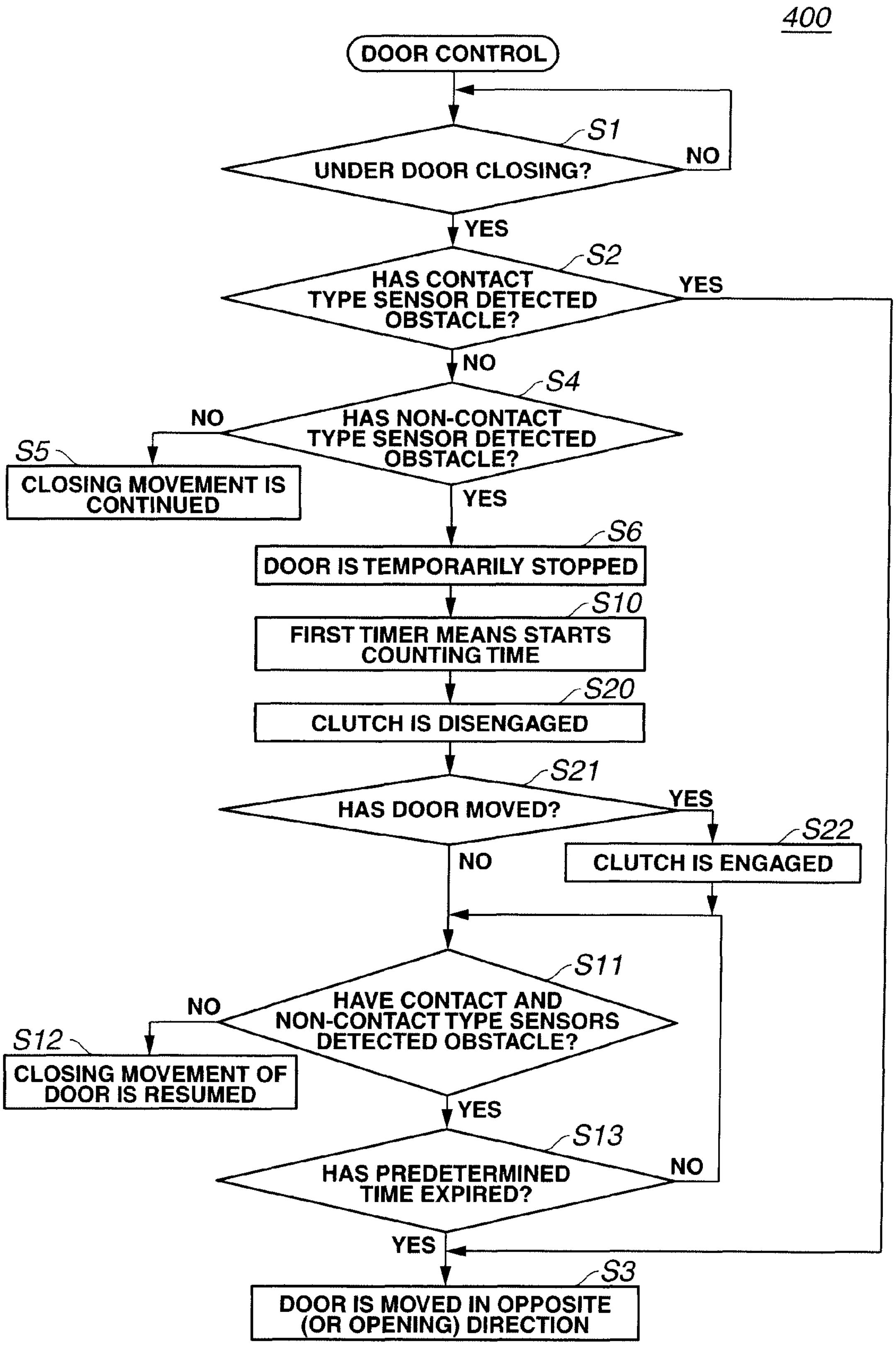
FIG. 7 is a flowchart of programmed operation steps executed by the control unit for carrying out a door control of a fourth embodiment of the invention.

As is seen from the flowchart of FIG. 7, the respective operations of steps S1 to S10 are the same as those of the above-mentioned second embodiment 200. Thus, explanation of such steps will be substantially omitted from the following description.

As soon as the first timer means starts time counting (S10), the engaged condition of the electromagnetic clutch 42 is released (S20), which permits free movement of the slide door 1. But, if the vehicle is placed on a slope and thus the slide door 1 moves obliquely downward due to its own weight, step S21 issues YES answer based on the door movement detecting signal issued from the door movement detecting sensor 13. Upon this, the clutch 42 is engaged to provide the moving sliding door 1 with a braking force. Thus, the downward movement of the door 1 is stopped. Then, the operation flow goes to step S11.

If the vehicle is placed on a horizontal place and thus the slide door 1 does not move, step S21 issues NO answer. Upon this, the operation flow goes to step S11. If the two sensors 6 and 7 detect no obstacle or passenger in the door opening 12, the closing movement of the slide door 1 is resumed from the halt position (S12). When the two sensors 6 and 7 detect any obstacle or passenger in the predetermined time (for example, within ten minutes) from the time when the temporary halt control start, the operation of step S11 is repeated. However, if the detecting of the obstacle or passenger is made at or after the time when the predetermined time expires, the slide door 1 is moved in an opposite or opening direction (S3). In this fourth embodiment 400, clutch OFF step is employed. Thus, energy saving is achieved particularly when the vehicle is placed on a horizontal place.

In the following, a fifth embodiment 500 of the present invention will be described with reference to the flowchart of FIG. 8.

In the fifth embodiment 500, the following major controls (a), (b), (c3) and (d2) are carried out in the control unit 8 for controlling movement of the slide door 1.

(a) When it is judged that the slide door 1 is under closing movement and the contact type obstacle sensor 6 has detected an obstacle (or passenger) in the door opening 12, the door actuating device 4 is controlled to move the slide door 1 in an opposite (or opening) direction.

(b) When it is judged that the slide door 1 is under closing movement and the contact and non-contact type obstacle sensors 6 and 7 have detected no obstacle (or passenger) in the door opening 12, the door actuating device 4 is controlled to continue the closing movement of the slide door 1.

(c3) When it is judged that the slide door 1 is under closing movement, the contact type obstacle sensor 6 has detected no obstacle and the non-contact type obstacle sensor 7 has detected an obstacle, the door actuating device 4 is controlled to temporarily stop the closing movement of the slide door 1. Upon this, a first timer means starts to count a time. When, during the temporary halt of the slide door 1, the contact and non-contact type obstacle sensors 6 and 7 detect no obstacle (or passenger) in the door opening 12, the closing movement of the slide door 1 is resumed.

(d2) If the contact and non-contact type obstacle sensors 6 and 7 detect any obstacle (or passenger) and any door open instruction is issued, the door actuating device 4 is controlled to move the slide door 1 in an opposite (or opening) direction. If, at a time when the time counted by the first timer means shows a predetermined time (for example, ten minutes), the contact and non-contact type obstacle sensors 6 and 7 detect any obstacle (or passenger) and no door open instruction is issued, the door actuating device 4 is controlled to move the slide door 1 in an opposite (or opening) direction.

That is, in the fifth embodiment 500, the following programmed operation steps are carried out in the control unit 8 for controlling the slide door 1 that is under movement.

At step S1, judgment is carried out as to whether the slide door 1 is under closing movement or not. If NO, the same judging operation is repeated. While, if YES, the operation flow goes to step S2.

At step S2, judgment is carried out as to whether the contact type obstacle sensor 6 has detected an obstacle (or passenger) or not. If YES, the operation flow goes to step S3 to cause the door actuating device 4 to move the slide door 1 in an opposite or opening direction. While, if NO at step S2, the operation flow goes to step S4.

At step S4, judgment is carried out as to whether the non-contact type obstacle sensor 7 has detected an obstacle or not. If NO, the operation flow goes to step S5 to cause the door actuating device 4 to continue the closing movement of the slide door 1. While, if YES at step S4, the operation flow goes to step S6 to cause the door actuating device 4 to temporarily stop the closing movement of the slide door 1 by de-energizing the electric motor 41. Then, the operation flow goes to step S10.

At step S10, time starts to be counted by a first timer means and the operation flow goes to step S11.

At step S11, judgment is carried out as to whether the contact and non-contact type obstacle sensors 6 and 7 have detected any obstacle or not. If NO, the operation flow goes to step S12 to cause the door actuating device 4 to resume the closing movement of the slide door 1. While, if YES at step S11, the operation flow goes to step S30.

At step S30, judgment is carried out as to whether a door open instruction has been issued or not. Such instruction is issued from the remote control switch (not shown) or the door control switch 11. If YES at step S30, the operation flow goes to step S3 to cause the door actuating device 4 to move the slide door 1 in an opposite (viz., opening) direction from the temporary halt slight open position. While, if NO at step S30, the operation flow goes to step S13.

At step S13, judgment is carried out as to whether the time being counted by the first timer means shows a predetermined time (for example, ten minutes) or not. If NO, the operation flow goes back to step S11 to repeat the above-mentioned operation of step S11. While, if YES, that is, when it is judged that a predetermined time has passed from the time when the temporary halt control started, the operation flow goes to step S3 to cause the door actuating device 4 to move the slide door 1 in an opposite (viz., opening) direction.

The above-mentioned programmed operation steps of the fifth embodiment 500 will be much clearly understood from the following description.

Figure 8:
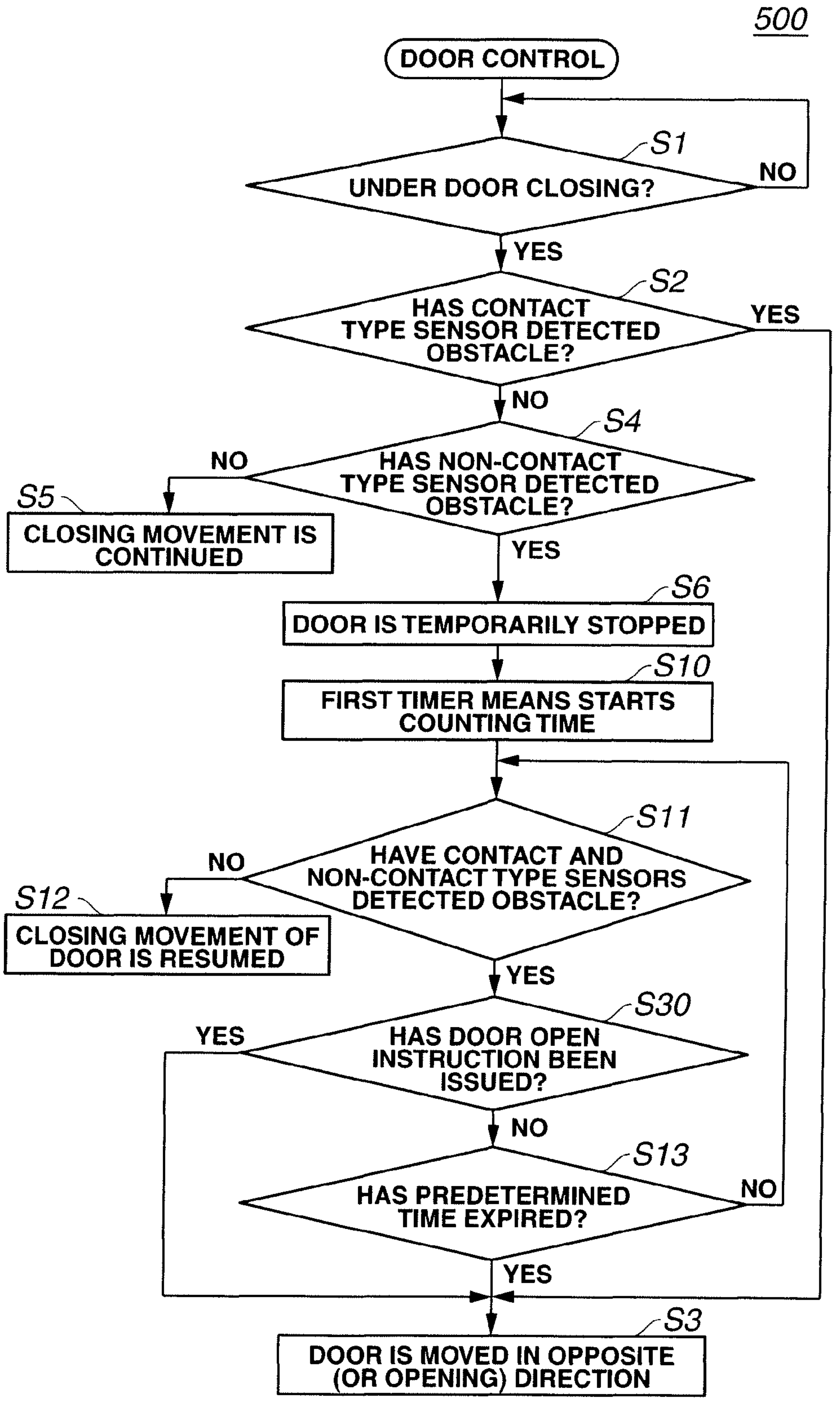
FIG. 8 is a flowchart of programmed operation steps executed by the control unit for carrying out a door control of a fifth embodiment of the invention.

As is seen from the flowchart of FIG. 8, the respective operations of steps S1 to S11 are the same as those of the above-mentioned second embodiment 200 of FIG. 5. Thus, explanation of such steps will be almost omitted from the following description.

When the sensors 6 and 7 detect an obstacle at step S11 (that is, step S11 issues YES answer) and then any door open instruction is issued (that is, step S30 issues YES answer), the door actuating device 4 is controlled to move the slide door 1 in an opposite (or opening) direction from the temporary halt slight open position. Furthermore, when the sensors 6 and 7 detect any obstacle at step S11, any door open instruction is issued and it is judged that a predetermined time has passed from the time when the temporary halt control started, the door actuating device 4 is controlled to move the slide door 1 in the opposite direction. Accordingly, in the fifth embodiment 500, the temporary halt control is affected by the operation of the remote control switch (not shown) and the door control switch 11.

Figure 9:
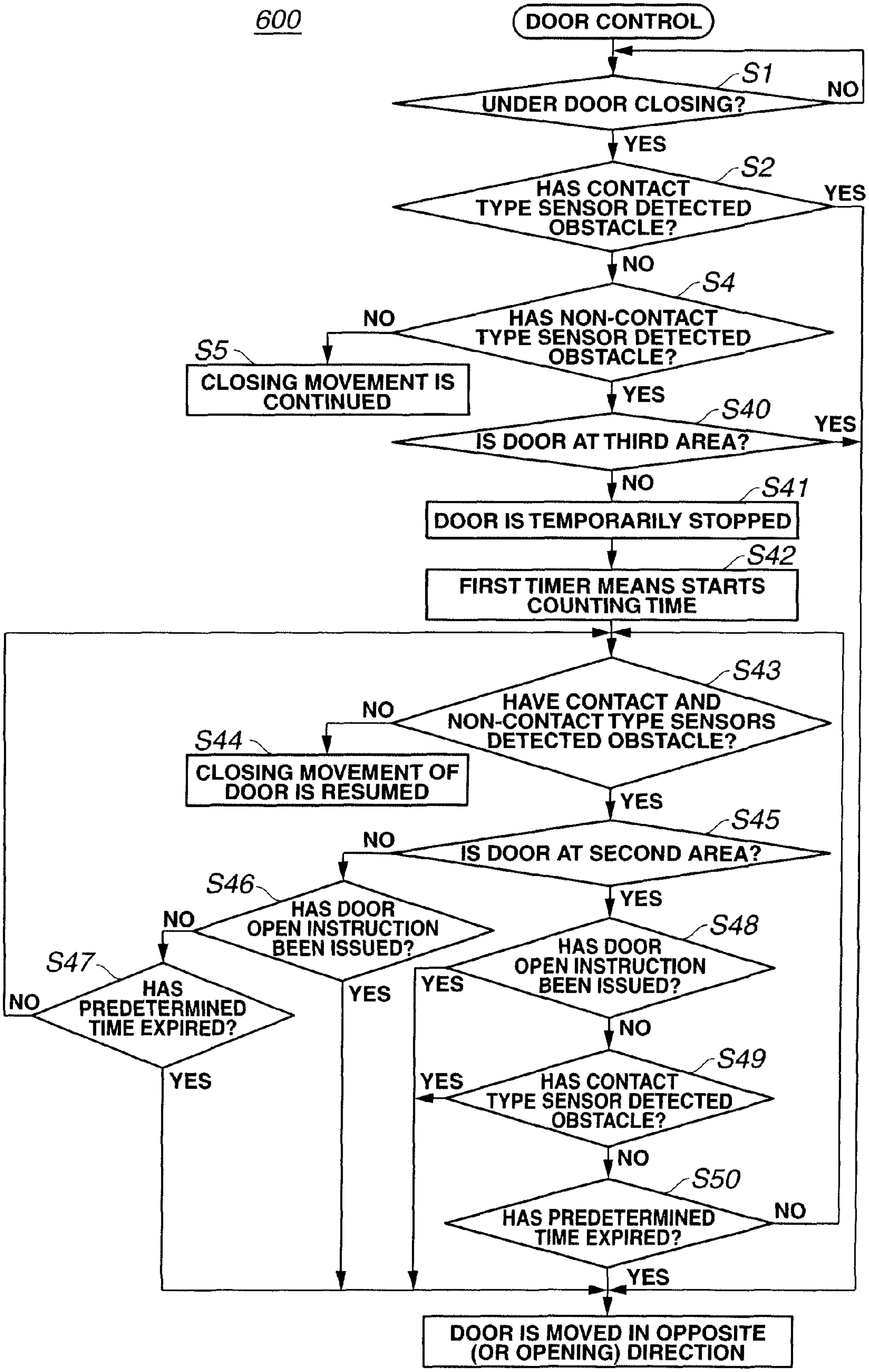
FIG. 9 is a flowchart of programmed operation steps executed by the control unit for carrying out a door control of a sixth embodiment of the invention.

In the following, a sixth embodiment 600 of the present invention will be described with reference to the flowchart of FIG. 9.

In the sixth embodiment 600, the following major controls (a), (b), (c4) and (d3) are carried out in the control unit 8 for controlling movement of the slide door 1.

(a) When it is judged that the slide door 1 is under closing movement and the contact type obstacle sensor 6 has detected an obstacle or passenger in the door opening 12, the door actuating device 4 is controlled to move the slide door 1 in an opposite (or opening) direction.

(b) When it is judged that the slide door 1 is under closing movement and the contact and non-contact type obstacle sensors 6 and 7 have detected no obstacle (or passenger) in the door opening 12, the door actuating device 4 is controlled to continue the closing movement of the slide door 1.

(c4) When it is judged that the slide door 1 is under closing movement, the contact type obstacle sensor 6 has detected no obstacle and the non-contact type obstacle sensor 7 has detected an obstacle in the door opening 12 at the third area (see FIG. 2), the door actuating device 4 is controlled to move the slide door 1 in an opposite (or opening) direction. While, if the non-contact type obstacle sensor 7 has detected the obstacle at an area other than the third area, the door actuating device 4 is controlled to temporarily stop the slide door 1. Upon this, a first timer means starts to count a time.

(d3) When, during the temporary halt control for the slide door 1, the contact and non-contact obstacle sensors 6 and 7 detect no obstacle, the door actuating device 4 is controlled to resume the closing movement of the slide door 1. While, when, during the temporary halt control for the slide door 1, the contact and non-contact obstacle sensors 6 and 7 detect any obstacle at an area other than the second area (see FIG. 2) and any door open instruction is issued, the door actuating device 4 is controlled to move the slide door 1 in an opposite (or opening) direction. If such door open instruction is not issued and the time counted by the first tinier means shows a predetermined time (for example, ten minutes), the door actuating device 4 is controlled to move the slide door 1 in an opposite (or opening) direction. If such door open instruction is issued when the slide door 1 takes the second area and the contact type obstacle sensor 6 detects any obstacle, the door actuating device 4 is controlled to move the slide door 1 in an opposite (or opening) direction. If, at time when the time counted by the first timer means shows a predetermined time (for example, ten minutes), the contact type obstacle sensor 6 detects no obstacle, the door actuating device 4 is controlled to move the slide door 1 in an opposite (or opening) direction.

That is, in the sixth embodiment 600, the following programmed operation steps are carried out in the control unit 8 for controlling the slide door 1 that is under movement.

At step S1, judgment is carried out as to whether the slide door 1 is under closing movement of not. If NO, the same judging operation is repeated. While, if YES, the operation flow goes to step S2.

At step S2, judgment is carried out as to whether the contact type obstacle sensor 6 has detected an obstacle (or passenger) or not. If YES, the operation flow goes to step S3 to cause the door actuating device 4 to move the slide door 1 in an opposite or opening direction. While, if NO at step S2, the operation flow goes to step S4.

At step S4, judgment is carried out as to whether the non-contact type obstacle sensor 7 has detected an obstacle or not. If NO, the operation flow goes to step S5 to cause the door actuating device 4 to continue the closing movement of the slide door 1. While, if YES at step S4, the operation flow goes to step S40.

At step S40, judgment is carried out as to whether the slide door 1 is in the third area or not, that is, whether the slide door 1 provides only a very small open area or not. If YES, the operation flow goes to step S3 to cause the door actuating device 4 to move the slide door 1 in an opposite (or opening) direction. If NO, that is, when the slide door 1 provides a somewhat larger opening, the operation flow goes to step S41.

At this step S41, the door actuating device 4 is controlled to temporarily stop the closing movement of the slide door 1. Then, the operation flow goes to step S42.

At this step S42, a first timer means starts to count a time, and then the operation flow goes to step S43.

At step S43, judgment is carried out as to whether the contact and non-contact type obstacle sensors 6 and 7 have detected any obstacle in the door opening 12 or not. If NO, the operation flow goes to step S44 to cause the door actuating device 4 to resume the closing movement of the slide door 1. While, if YES at step S43, the operation flow goes to step S45.

At step S45, judgment is carried out as to whether the slide door 1 is in the second area (or medium open area) or not. If NO, the operation flow goes to step S46. At this step S46, judgment is carried out as to whether a door open instruction has been issued or not. If YES, the operation flow goes to step S3 to cause the door actuating device 4 to move the slide door 1 in an opposite (or opening) direction. If NO at step S46, the operation flow goes to step S47. At this step S47, judgment is carried out as to whether the time counted by the first timer means shows a predetermined time (for example, ten minutes) or not. If NO, the operation flow goes back to step S43 to repeat the operation of this step S43. While, if YES at step S46, the operation flow goes to step S3 to cause the door actuating device 4 to move the slide door 1 in an opposite (or opening) direction.

If YES at step S45, the operation flow goes to step S48.

At step S48, judgment is carried out as to whether a door open instruction has been issued or not. If YES, the operation flow goes to step S3 to cause the door actuating device 4 to move the slide door 1 in an opposite (or opening) direction. While, if NO at step S48, the operation flow goes to step S49.

At step S49, judgment is carried out as to whether the contact and non-contact type obstacle sensors 6 and 7 have detected an obstacle or not. If YES, the operation flow goes to step S3 to cause the door actuating device 4 to move the slide door 1 in an opposite (or opening) direction. If NO at step S49, the operation flow goes to step S50.

At step S50, judgment is carried out as to whether the time counted by the first timer means has shown a predetermined time (for example, ten minutes) or not. If NO, the operation flow goes back to step S43 to repeat the operation of this step S43. While, if YES, the operation flow goes to step S3 to cause the door actuating device 4 to move the slide door 1 in an opposite (or opening) direction.

As is described hereinabove, in this sixth embodiment 600, the position of the slide door 1 forms one factor for controlling movement of the slide door 1. That is, when, during the closing movement of the slide door 1, the non-contact type obstacle sensor 7 detects an obstacle in the door opening 12 at the third area, the slide door 1 is moved in an opposite (or opening) direction. Thus, the obstacle is suppressed from being pinched by the door 1. Furthermore, when, during the temporary halt of the door 1, the contact and non-contact type obstacle sensors 6 and 7 detect an obstacle in the door opening 12 at the second area, the door actuating device 4 is controlled to move the slide door 1 in an opposite (or opening) direction upon receiving a door open instruction.

In the following, modifications of the above-mentioned embodiments will be described without the aid of the flowcharts.

A first modification is similar to the above-mentioned sixth embodiment 600 of FIG. 9, and thus, only operations that are different from those of the sixth embodiment 600 will be described in the following.

When, due to manipulation of the remote control switch (not shown) or the door control switch 11, the slide door 1 is being moved in a closing or opening direction and the door movement detecting sensor 13 detects the slide door 1 that has come to the first or second area, the door actuating device 4 is controlled to temporarily stop the slide door 1 at a half position upon detecting an obstacle by the non-contact type obstacle sensor 7. Furthermore, when, during the temporary halt of the slide door 1, it is detected that the door 1 is placed at the first area, detecting an obstacle by the contact type obstacle sensor 6 induces a continuation of the temporary halt control. While, when the contact and non-contact type obstacle sensors 6 and 7 detect no obstacle, the door actuating device 4 is controlled to move the slide door 1 in the same direction as that in which the slide door 1 moved before the temporary halt control. Furthermore, when it is detected that the slide door 1 is placed at the second area, the door actuating device 4 is controlled to move the slide door 1 in an opposite direction.

A second modification is also similar to the above-mentioned sixth embodiment 600 of FIG. 9, and thus, only operations that are different from those of the sixth embodiment 600 will be described in the following.

When, due to manipulation of the remote control switch (not shown) or the door control switch 11, the slide door 1 is being moved in a closing or opening direction and the door movement detecting sensor 13 detects the slide door 1 that has come to the first or second area, the door actuating device 4 is controlled to temporarily stop the slide door 1 at a halt position upon detecting an obstacle by the contact type obstacle sensor 6. While, when the sensor 13 detects the slide door 1 that has come to the third area, the door actuating device 4 is controlled to move the slide door 1 in an opposite direction upon detecting an obstacle by the non-contact type obstacle sensor 7. Furthermore, when, during the temporary halt of the slide door 1, it is detected that the door 1 is placed at the first area, detection of an obstacle by the contact type obstacle sensor 6 induces a continuation of the temporary halt control. While, when the contact and non-contact type obstacle sensors 6 and 7 detect no obstacle, the door actuating device 4 is controlled to move the slide door 1 in the same direction as that in which the slide door 1 moved before the temporary halt control. Furthermore, when it is detected that the slide door 1 is placed at the second area, the door actuating device 4 is controlled to move the slide door 1 in an opposite direction.

A third modification is also similar to the above-mentioned sixth embodiment 600 of FIG. 9, and thus, only operations that are different from those of the sixth embodiment 600 will be described in the following.

When, due to manipulation of the remote control switch (not shown) or the door control switch 11, the slide door 1 is being moved in a closing or opening direction and the door movement detecting sensor 13 detects the slide door 1 that has come to the first or second area, the door actuating device 4 is controlled to temporarily stop the slide door 1 at a half position upon detecting an obstacle by the contact type obstacle sensor 6. While, when the sensor 13 detects the slide door 1 that has come to the third area, the door actuating device 4 is controlled to move the slide door 1 in an opposite direction upon detecting an obstacle by the non-contact type obstacle sensor 7. When, during the temporary halt of the slide door 1, it is detected that the slide door 1 is placed at the first area at a time when a predetermined time (for example, 10 minutes) has passed from the time when the temporary halt control started, detection of an obstacle by the contact type obstacle sensor 6 induces continuation of the temporary halt control. While, when the contact and non-contact type obstacle sensors 6 and 7 detect no obstacle, the door actuating device 4 is controlled to move the slide door 1 in the same direction as that in which the slide door 1 moved before the temporary halt control. While, when it is detected that the slide door 1 is placed at the second area, the door actuating device 4 is controlled to move the slide door 1 in an opposite direction upon detecting an obstacle by the contact type obstacle sensor 6.

The entire contents of Japanese Patent Application 2008-063844 filed Mar. 13, 2008 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An electrically powered door actuating system of a motor vehicle, comprising:

a door actuating device that, upon manipulation of a door control switch means, moves a slide door in closing or opening direction with power of an electric motor;

a contact type obstacle sensor that detects an obstacle on a given track of the door by contacting the same;

a non-contact type obstacle sensor that detects an obstacle on the given track of the door without contacting the same; and a control unit that controls the door actuating device by processing information signals issued from the door control switch means and the contact and non-contact type obstacle sensors, wherein the control unit is configured to carry out:

when the door actuating device is moving the door due to manipulation of the door control switch means, controlling the door actuating device to move the door in an opposite direction upon detecting an obstacle by the contact type obstacle sensor;

when the door actuating device is moving the door due to manipulation of the door control switch means, controlling the door actuating device to temporarily stop the movement of the door upon detecting an obstacle by the non-contact type obstacle sensor; and when the temporary stop of the door is being kept by the door actuating device, controlling the door actuating device to keep the temporary stop of the door upon detecting an obstacle by the contact and non-contact type obstacle sensors, and controlling the door actuating device to move the door in the same direction as that in which the door moved before the temporary stop of the door upon detecting no obstacle by the contact and non-contact obstacle sensors.

2. An electrically powered door actuating system as claimed in claim 1, in which the control unit is configured to further carry out:

when the door actuating device is moving the door due to manipulation of the door control switch means, controlling the door actuating device to continue the movement of the door upon detecting no obstacle by the non-contact type obstacle sensor.

3. An electrically powered door actuating system as claimed in claim 1, in which the control unit is configured to further carry out:

when, during the temporary stop of the door, the contact and non-contact type obstacle sensors detect an obstacle in a predetermined time from the time when the temporary stop of the door started, controlling the door actuating device to continue the temporary stop of the door;

when, during the temporary stop of the door, the contact and non-contact type obstacle sensors detect no obstacle, controlling the door actuating device to move the door in the same direction as that in which the door moved before the temporary stop of the door; and when, during the temporary stop of the door, the contact and non-contact type obstacle sensors detect an obstacle at a time when the predetermined time expires, controlling the door actuating device to move in a direction opposite to the direction in which the door moved before the temporary stop of the door.

4. An electrically powered door actuating system as claimed in claim 1, in which the control unit is configured to further carry out:

when, during the temporary stop of the door, the contact and non-contact type obstacle sensors detect an obstacle in a predetermined time from the time when the temporary stop of the door started, controlling the door actuating device to continue the temporary stop of the door;

when, during the temporary stop of the door, the contact and non-contact type obstacle sensors detect no obstacle, controlling the door actuating device to move the door in the same direction as that in which the door moved before the temporary stop of the door; and when, during the temporary stop of the door, the contact and non-contact type obstacle sensors detect an obstacle at a time when the predetermined time expires, discontinuing the control of the door actuating device.

5. An electrically powered door actuating system as claimed in claim 3, in which the control unit is configured to further carry out:

after the temporary stop of the door is made, controlling the door actuating device to release an operative connection between the electric motor and the door actuating device; and when a movement of the door is detected, controlling the door actuating device to establish the operative connection between the electric motor and the door actuating device.

6. An electrically powered door actuating system as claimed in claim 5, in which the release and establishment of the operative connection between the electric motor and the door actuating device is made by an electromagnetic clutch.

7. An electrically powered door actuating system as claimed in claim 3, in which the control unit is configured to further carry out:

when, during the temporary stop of the door, a door opening instruction is issued from the door control switch means, controlling the door actuating device to move the door in a direction opposite to the direction in which the door moved before the temporary stop of the door.

8. An electrically powered door actuating system as claimed in claim 1, in which the control unit is configured to further carry out:

when the non-contact type obstacle sensor senses an obstacle at a time when the door is placed to define only a very small space in a door opening, controlling the door actuating device to move the door in an opposite direction.

9. An electrically powered door actuating system as claimed in claim 3, in which the control unit is configured to further carry out:

when, before the temporary stop of the door, the non-contact type obstacle sensor senses an obstacle at a time when the door is placed to define only a very small space in a door opening, controlling the door actuating device to move the door in an opposite direction.

10. An electrically powered door actuating system as claimed in claim 9, in which the control unit is configured to further carry out:

when, during the temporary stop of the door, the door is placed to define a larger space for the door opening and a door open instruction is issued from the door control switch means, controlling the door actuating device to move the door in a direction opposite to the direction in which the door moved before the temporary stop of the door.

11. An electrically powered door actuating system of a motor vehicle with a slide door, comprising:

a door actuating device that, upon manipulation of a door control switch means, moves the slide door in a closing direction with power of an electric motor;

an electromagnetic clutch that is operatively disposed between the door actuating device and the electric motor;

a contact type obstacle sensor that detects an obstacle on a given track of the door by contacting the same;

a non-contact type obstacle sensor that detects an obstacle on the given track of the door without contacting the same; and a control unit that controls the door actuating device and the electromagnetic clutch by processing information signals issued from the door control switch means and the contact and non-contact type obstacle sensors, wherein the control unit is configured to carry out:

under a condition wherein the door actuating device is controlled to move the door in a closing or opening direction upon manipulation of the door control switch means, controlling the door actuating device to move the door in an opposite direction upon detecting an obstacle by the contact type obstacle sensor, and controlling the door actuating device to temporarily stop the movement of the door upon detecting an obstacle by the non-contact type obstacle sensor; and under a condition wherein the temporary stop of the door is kept, controlling the door actuating device to continue the temporary stop of the door upon detecting an obstacle by the contact and non-contact type obstacle sensors, and controlling the door actuating device to move the door in the same direction as that in which the door moved before the temporary stop of the door upon detecting no obstacle by the contact and non-contact type obstacle sensors.

12. An electrically powered door actuating system as claimed in claim 11, in which the control unit is configured to further carry out:

under a condition wherein during the temporary stop of the door the contact and non-contact type obstacle sensors sense an obstacle, controlling the door actuating device to move the door in a direction opposite to that in which the door moved before the temporary stop of the door, upon detecting that a predetermined time has passed from the time when the temporary stop of the door started.

13. An electrically powered door actuating system as claimed in claim 11, in which the control unit is configured to further carry out:

under a condition wherein during the temporary stop of the door the contact and non-contact type obstacle sensors sense an obstacle, discontinuing the door moving control of the door actuating device upon detecting that a predetermined time has passed from the time when the temporary stop of the door started.

14. An electrically powered door actuating system as claimed in claim 12, in which the control unit is configured to further carry out:

after starting counting of the time, releasing an engaged condition of the electromagnetic clutch; and when movement of the door is detected, establishing the engaged condition of the electromagnetic clutch.

15. An electrically powered door actuating system as claimed in claim 12, in which the control unit is configured to further carry out:

when, after detection of an obstacle by the contact and non-contact type obstacle sensors, a door open instruction is issued from the door control switch means, controlling the door actuating device to move the door in a direction opposite to the direction in which the door moved before the temporary stop of the door.

16. An electrically powered door actuating system as claimed in claim 12, in which the control unit is configured to further carry to out:

when, after detection of the obstacle by the non-contact type obstacle sensor, it is detected that the door is placed to define a very small space in a door opening, controlling the door actuating device to move the door in an opposite direction.

17. An electrically powered door actuating system as claimed in claim 16, in which the control unit is configured to further carry out:

when, after detection of the obstacle by the contact and non-contact type obstacle sensors, it is detected that the door is placed to define a larger space for the door opening, controlling the door actuating device to move the door in an opposite direction upon receiving a door open instruction from the door control switch means.

18. An electrically powered door actuating system as claimed in claim 16, in which the control unit is configured to further carry out:

when, after detection of the obstacle by the contact and non-contact type obstacle sensors, it is detected that the door is placed to define a larger space for the door opening and no door open instruction is issued from the door control switch means, controlling the door actuating device to move the door in an opposite direction upon detecting an obstacle by the contact type obstacle sensor.

19. An electrically powered door actuating system as claimed in claim 16, in which the control unit is configured to further carry out:

when, after detection of an obstacle by the contact and non-contact type obstacle sensors, it is detected that the door is not placed to define a larger space for the door opening, controlling the door actuating device to move the door in an opposite direction upon receiving a door open instruction from the door control switch means.

20. An electrically powered door actuating system as claimed in is claim 19, in which the control unit is configured to further carry out:

when receiving no door open instruction from the door control switch means, controlling the door actuating device to move the door in an opposite direction upon detecting that the predetermined time expires.

* * * * *